United States Patent
Kim

(10) Patent No.: US 9,227,319 B2
(45) Date of Patent: Jan. 5, 2016

(54) ROBOT CONTROL SYSTEM AND METHOD

(75) Inventor: Yoon Soo Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1000 days.

(21) Appl. No.: 13/314,802

(22) Filed: Dec. 8, 2011

(65) Prior Publication Data

US 2012/0191244 A1 Jul. 26, 2012

(30) Foreign Application Priority Data

Jan. 24, 2011 (KR) .................... 10-2011-0006695

(51) Int. Cl.
G05B 19/04 (2006.01)
B25J 9/16 (2006.01)
G06Q 10/10 (2012.01)

(52) U.S. Cl.
CPC ........ *B25J 9/1602* (2013.01); *B25J 9/16* (2013.01); *B25J 9/161* (2013.01); *B25J 9/1605* (2013.01); *B25J 9/1674* (2013.01); *G06Q 10/101* (2013.01); *G05B 2219/33275* (2013.01); *G05B 2219/33278* (2013.01); *G05B 2219/39251* (2013.01); *G05B 2219/39252* (2013.01); *G05B 2219/40304* (2013.01)

(58) Field of Classification Search
CPC .......... B25J 9/1602; B25J 9/1674; B25J 9/16; B25J 9/1605; B25J 9/161; G05B 2219/34282; G05B 2219/34281; G05B 2219/34285; G05B 13/0205; G05B 11/01; G05B 9/161; G05B 9/1661; G05B 9/1666; G05B 19/0423; G05B 2219/39251; G05B 2219/39252; G05B 2219/40304; G06N 3/008; G06F 9/455; G06F 21/00; G06F 21/44; G06F 21/45; G06F 21/57; G06Q 10/101
USPC .................. 901/1, 50; 700/249, 245, 247
See application file for complete search history.

(56) References Cited

U.S. PATENT DOCUMENTS

| | | | | |
|---|---|---|---|---|
| 6,078,747 | A * | 6/2000 | Jewitt ........................... | 717/164 |
| 6,889,118 | B2 * | 5/2005 | Murray et al. ................ | 700/250 |
| 7,895,257 | B2 * | 2/2011 | Helal et al. ................... | 709/201 |
| 2003/0014521 | A1 * | 1/2003 | Elson et al. ................... | 709/225 |
| 2003/0139850 | A1 * | 7/2003 | Sakamoto et al. ............ | 700/245 |
| 2003/0171846 | A1 * | 9/2003 | Murray et al. ................ | 700/245 |
| 2004/0104702 | A1 * | 6/2004 | Nakadai et al. .......... | 318/568.12 |
| 2004/0148268 | A1 * | 7/2004 | Reil .............................. | 706/904 |
| 2007/0219666 | A1 * | 9/2007 | Filippov et al. .............. | 700/245 |
| 2007/0294662 | A1 * | 12/2007 | Kim et al. ..................... | 717/107 |
| 2008/0133058 | A1 * | 6/2008 | Ohno ............................ | 700/259 |
| 2009/0058342 | A1 | 3/2009 | Nihei et al. | |

(Continued)

*Primary Examiner* — Thomas G Black
*Assistant Examiner* — Sze-Hon Kong
(74) *Attorney, Agent, or Firm* — Harness, Dickey & Pierce, P.L.C.

(57) ABSTRACT

A robot control system and method includes plural actuators provided on a robot, plural controller modules, each of which controls at least one of the actuators and includes a program to perform a motion and an ID, an adjustment module to register a control right of each controller module over the at least one of the actuators and to perform at least one motion when a request for the at least one motion is made, and an abstraction layer module to judge whether or not a detected controller module is a controller module having the control right over the at least one of the actuators by confirming the ID of the controller module, and to drive the at least one of the actuators by controlling execution of the controller module upon judging that the detected controller module is the controller module having the control right.

24 Claims, 6 Drawing Sheets

(56) References Cited

U.S. PATENT DOCUMENTS

| | | |
|---|---|---|
| 2009/0128080 A1* | 5/2009 | Cheng et al. .................. 318/625 |
| 2009/0198379 A1 | 8/2009 | Komuro et al. |
| 2010/0031351 A1* | 2/2010 | Jung et al. ....................... 726/21 |
| 2011/0029128 A1* | 2/2011 | Serre et al. .................... 700/245 |
| 2011/0178619 A1* | 7/2011 | Jung et al. ....................... 700/95 |
| 2011/0231014 A1* | 9/2011 | Krajewski et al. ............. 700/245 |
| 2012/0110642 A1* | 5/2012 | Grassel et al. .................... 726/4 |

* cited by examiner

ROBOT CONTROL SYSTEM AND METHOD

CROSS-REFERENCE TO RELATED APPLICATIONS

This application claims the benefit of Korean Patent Application No. 2011-0006695, filed on Jan. 24, 2011 in the Korean Intellectual Property Office, the disclosure of which is incorporated herein by reference.

BACKGROUND

1. Field

Embodiments relate to a robot control system and method to execute a plurality of programs.

2. Description of the Related Art

In general, robots are machines which have a joint system similar to that of a human and perform the same motions as those of human hands and legs using such a joint system.

Industrial robots for automation and unmanned operation of production in factories were the first to be introduced. Recently, vigorous development of service robots to supply various services to humans is underway.

Such service robots supply services to humans while performing walking through imitation of walking of humans, and perform image recognition processing and voice recognition processing, thereby communicating with humans at a higher intellectual level.

A robot possesses various modeled programs regarding motions, such as an emotional model, a motion model and a learning model. The robot makes a motion plan in response to an external factor, such as a user's action, according to these models and embodies the motion plan through driving of respective joint actuators or voice output, thereby achieving autonomous thought and motion control.

In such a robot, in order to simultaneously perform various motions of different joints, such as turning the head of the robot in a direction of noise while walking, the robot executes programs to perform the different motions using a plurality of controller modules, thereby simultaneously controlling the different joints.

However, in this case, collisions between the programs are generated, thereby causing serious problems, such as failure of the robot, environmental destruction and harm to humans.

Thus, the robot applies restriction to allow operation of only one controller module at a time, thereby preventing collisions between control commands of the various controller modules. But, in this case, there is a problem, such as a difficulty in simultaneously performing plural motions.

SUMMARY

Therefore, it is an aspect to provide a robot control system and method which adjusts control rights of plural controller modules controlling actuators of a robot.

It is another aspect to provide a robot control system and method in which controller modules have a common interface.

Additional aspects will be set forth in part in the description which follows and, in part, will be obvious from the description, or may be learned by practice of the invention.

In accordance with one aspect, a robot control system may include a plurality of actuators provided on a robot, a plurality of controller modules, each of which controls at least one of the plurality of actuators and may include a program to perform a motion of the robot and an ID, an adjustment module to register a control right of each of the plurality of controller modules over at least one of the plurality of actuators and to perform at least one motion when a request for the at least one motion is made, and an abstraction layer module to judge whether or not a detected controller module is a controller module having the control right over the at least one of the plurality of actuators by confirming the ID of the detected controller module, and to drive the at least one of the plurality of actuators by controlling execution of the controller module upon judging that the detected controller module is the controller module having the control right over the at least one of the plurality of actuators.

The robot control system may further include an interface module requesting the at least one motion of the robot.

The adjustment module may ask the controller modules a question as to which actuators are necessary to execute the at least one motion.

The plurality of controller modules may decide actuators capable of performing the at least one motion, and transmit data of the decided actuators to the adjustment module when the plurality of controller modules receives a question signal from the adjustment module.

The adjustment module, when data of the actuators corresponding to the question from the plurality of controller modules are transmitted to the adjustment module, may judge whether or not the actuators, the data of which have been transmitted, are available, provide the control rights over the actuators to the plurality of controller modules if the actuators are available, and cancel execution of the plurality of controller modules if the actuators are unavailable.

The plurality of controller modules may decide actuators capable of performing the at least one motion, and make a request for the control rights over the decided actuators to the adjustment module.

The adjustment module may make a request for control registration rights to register the control rights over all of the plurality of actuators provided on the robot to the abstraction layer module, and register the control registration rights over all of the plurality of actuators when a control registration right permission signal is transmitted from the abstraction layer module to the adjustment module.

The abstraction layer module, when the abstraction layer module receives a control registration right request signal over all of the plurality of actuators from the adjustment module, may confirm whether or not there is any module already having the control registration rights over all of the plurality of actuators, and permit the adjustment module having made the request for the control registration rights to have the control registration rights over all of the plurality of actuators if there is no module already having the control registration rights.

The robot control system may further include a timer module to generate a tick signal per designated period, and the adjustment module may instruct the controller module to execute the program corresponding to the tick signal from the timer module.

The abstraction layer module, when a control command corresponding to execution of the program of the controller module is transmitted to the abstraction layer module, may confirm whether or not the controller module is an owner of the control right over the at least one of the plurality of actuators, and transmit the control command to the at least one of the plurality of actuators upon confirming that the controller module is the owner of the control right over the at least one of the plurality of actuators.

The abstraction layer module may transmit a control violation signal of the controller module over the at least one of the plurality of actuators to the adjustment module upon confirming that the controller module is not the owner of the control right over the at least one of the plurality of actuators.

The abstraction layer module may include an interface to register and withdraw the control registration rights.

The adjustment module may manage a controller module list having data regarding the control rights of the controller modules over the actuators, and, when the adjustment module receives the control right violation signal from the abstraction layer module, delete the controller module, the control right of which is violated, from the controller module list in which the control rights of each of the plurality of controller modules over the at least one of the plurality of actuators are stored.

The abstraction layer module may include an application programming interface (API), and the controller module may transmit the control command to the abstraction layer module using the API.

Each of the plurality of controller modules and the adjustment module may include a run unit, and the run unit may be one of a thread, a task and a process.

In accordance with another aspect, a robot control method in which at least one motion is performed by controlling at least one of a plurality of actuators provided on a robot, may include, when an adjustment module receives a request for performance of the at least one motion, detecting a controller module capable of performing the at least one motion from the plurality of controller modules, transmitting a control command corresponding to the performance of the at least one motion to an abstraction layer module, judging whether or not the detected controller module is an owner of a control right over the at least one of the plurality of actuators to perform the at least one motion by confirming an ID of the detected controller module by the abstraction layer module, and transmitting the control command from the abstraction layer module to the at least one of the plurality of actuators upon judging that the detected controller module is the owner of the control right over the at least one of the plurality of actuators to perform the at least one motion.

The robot control method may further include, when the adjustment module receives the request for performance of at least one motion of the robot, detecting the controller module capable of performing the at least one motion, generating the controller module capable of performing the at least one motion if there is no controller module to perform the at least one motion, allowing the generated controller module to decide the at least one of the plurality of actuators necessary to perform the at least one motion based on motion data to perform the at least one motion, allowing the adjustment module to ask the generated controller module a question as to which actuator is necessary to perform the at least one motion, transmitting data of the necessary actuator corresponding to the question of the adjustment module from the controller module to the adjustment module, allowing the adjustment module to judge whether or not the necessary actuator is available, and allowing the adjustment module to provide a control right over the necessary actuator to the generated controller module upon judging that the necessary actuator is available.

The robot control method may further include transmitting a control right permission request signal, permitting the controller module to have the control right over the necessary actuator, from the adjustment module to the abstraction layer module, allowing the abstraction layer module to judge whether or not the adjustment module having transmitted the control right permission request signal is an owner of control registration rights by checking an ID of the adjustment module, when a control right permission request is transmitted to the abstraction layer module, allowing the abstraction layer module to permit the controller module to have the control right over the necessary actuator, upon judging that the adjustment module having transmitted the control right permission request signal is the owner of control registration rights, and driving the necessary actuator by executing a program of the controller module permitted to have the control right over the necessary actuator.

The robot control method may further include registering the generated controller module as the owner of the control right of the necessary actuator in the abstraction layer module, upon judging that the adjustment module having transmitted the control right permission request signal is the owner of control registration rights, and registering the generated controller module and the necessary actuator in a controller module list stored in the adjustment module.

The robot control method may further include, after the judgment as to whether or not the necessary actuator is available, canceling the generated controller module upon judging that the necessary actuator is not available.

The robot control method may further include allowing the adjustment module to make a request for control registration rights, to register the control rights over all of the plurality of actuators provided on the robot, to the abstraction layer module, allowing the abstraction layer module to confirm whether or not there is any module already having the control registration rights, when the abstraction layer module receives a control registration right request signal, permitting the adjustment module having made the request for the control registration rights to have the control registration rights over all of the plurality of actuators if there is no module already having the control registration rights, and acquiring the control registration rights over all of the plurality of actuators, when a control registration right permission signal is transmitted from the abstraction layer module to the adjustment module.

The robot control method may further include allowing the adjustment module to instruct the controller module to execute a program, when a tick signal of a timer module is transmitted to the adjustment module.

The robot control method may further include allowing the abstraction layer module to generate a control violation signal of the controller module to the at least one of the plurality of actuators upon judging that the detected controller module is not the owner of the control right over the at least one of the plurality of actuators, allowing the abstraction layer module to make a request for withdrawal of the control right of the controller module to the adjustment module, and allowing the adjustment module to withdraw the control right of the controller module.

The withdrawal of the control right of the controller module may include deleting the controller module, the control right of which is violated, from a controller module list stored in the adjustment module.

The judgment as to whether or not the detected controller module is the owner of the control right over the at least one of the plurality of actuators to perform the at least one motion may include confirming an ID of a run unit of the detected controller module, and judging whether or not the ID of the run unit of the detected controller module is identical with an ID of a run unit of the controller module having the control right over the at least one of the plurality of actuators, stored in advance in the abstraction layer module.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
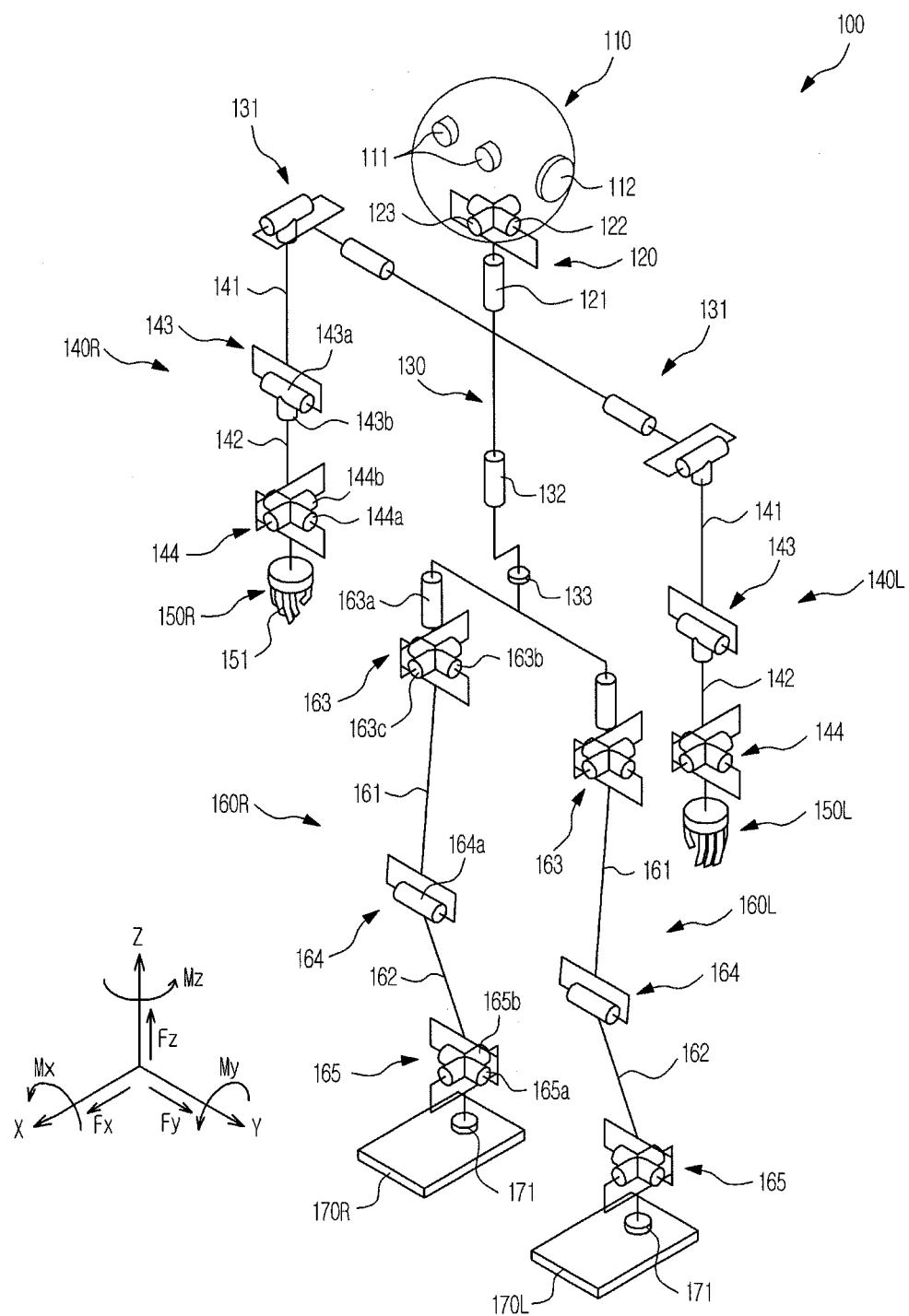
FIG. 1 is an exemplary view of a robot in accordance with one embodiment.

Reference will now be made in detail to the embodiments of the present invention, examples of which are illustrated in the accompanying drawings, wherein like reference numerals refer to like elements throughout.

FIG. 1 is an exemplary view of a robot in accordance with one embodiment.

As shown in FIG. 1, a robot 100 in accordance with one embodiment may include an upper body including a head 110, a neck 120, a torso 130, arms 140R and 140L and hands 150R and 150L, and a lower body including a plurality of legs 160R and 160L and feet 170R and 170L.

In more detail, the upper body of the robot 100 may include the head 110, the torso 130 connected to the lower portion of the head 110 through the neck 120, the two arms 140R and 140L connected to both sides of the upper portion of the torso 130, and the hands 150R and 150L respectively connected to tips of the two arms 140R and 140L.

The lower body of the robot 100 may include two legs 160R and 160L connected to both sides of the lower portion of the torso 130 of the upper body, and the feet 170R and 170L respectively connected to tips of the two legs 160R and 160L.

Here, the head 110, the two arms 140R and 140L, the two hands 150R and 150L, the two legs 160R and 160L, and the two feet 170R and 170L respectively may have designated degrees of freedom through joints.

Such upper and lower bodies of the robot 100 may be protected by a cover.

Here, "R" and "L" respectively indicate the right and left sides of the robot 100.

Cameras 111 to capture surrounding images and microphones 112 to detect a user's voice and sound around the robot 100 may be installed on the head 110.

The neck 120 may connect the head 110 and the torso 130. The neck 120 may include a neck joint unit.

The neck joint unit may include a rotary joint 121 in the yaw direction (rotated around the Z-axis), a rotary joint 122 in the pitch direction (rotated around the Y-axis), and a rotary joint 123 in the roll direction (rotated around the X-axis), and thus have 3 degrees of freedom. Here, the rotary joints 121, 122 and 123 of the neck joint unit may be respectively connected to head rotating motors (not shown).

Shoulder joints units 131 to connect the two arms 140R and 140L to the torso 130 may be respectively provided at both sides of the torso 130, a rotary joint unit 132 in the yaw direction to allow a breast to rotate around a waist may be provided between the breast and the waist, and a pose detection unit 133 to detect a pose of the upper body may be provided.

Each of the two arms 140R and 140L may include an upper arm link 141, a lower arm link 142, an elbow joint unit 143, and a wrist joint unit 144.

Here, the upper arm links 141 of the two arms 140R and 140L may be respectively connected to the torso 130 through shoulder joint units 131 and may be respectively connected to the lower arm links 142 through the elbow joint units 143. The lower arm links 142 may be connected to the hands 150R and 150L through the wrist joint units 144.

Each elbow joint unit 143 may include a rotary joint 143a in the pitch direction and a rotary joint 143b in the yaw direction, and thus has 2 degrees of freedom. Each wrist joint unit 144 may include a rotary joint 144a in the pitch direction and a rotary joint 144b in the roll direction, and thus have 2 degrees of freedom.

Each hand 150R or 150L may include five fingers 151 and a plurality of joints (not shown) driven by motors may be installed on the respective fingers 151. The fingers 151 perform various motions, such as gripping of an object or pointing in a specific direction, in connection with movement of the arms 140R and 140L.

Each of the two legs 160R and 160L of the robot 100 may include a thigh link 161, a calf link 162, a hip joint unit 163, a knee joint unit 164 and an ankle joint unit 165.

The thigh links 161 of the two legs 160 R and 160L may be respectively connected to the torso 130 through the hip joint units 163 and are respectively connected to the calf links 162 through the knee joint units 164. The calf links 162 may be respectively connected to the feet 170R and 170L through the ankle joint units 165.

Each hip joint unit 163 may include a rotary joint 163a in the yaw direction (rotated around the Z-axis), a rotary joint 163b in the pitch direction (rotated around the Y-axis), and a rotary joint 163c in the roll direction (rotated around the X-axis), and thus have 3 degrees of freedom.

Each knee joint unit 164 may include a rotary joint 164a in the pitch direction, and thus have 1 degree of freedom. Each ankle joint unit 165 may include a rotary joint 165a in the pitch direction and a rotary joint 165b in the roll direction, and thus have 2 degrees of freedom.

Since 6 rotary joints of the three joint units 163, 164 and 165 may be provided to each of the two legs 160R and 160L, a total of 12 rotary joints may be provided to the two legs 160R and 160L.

The robot 100 further may include multi-axis force and torque (F/T) sensors 171 respectively installed between the legs 160R and 160R and the feet 170R and 170L so as to detect load applied to the feet 170R and 170L.

Actuators, such as motors (not shown), may be provided at the respective joints of the robot 100. Thereby, the respective joints may perform proper rotating movements through rotation of the motors, thus achieving various motions.

Figure 2:
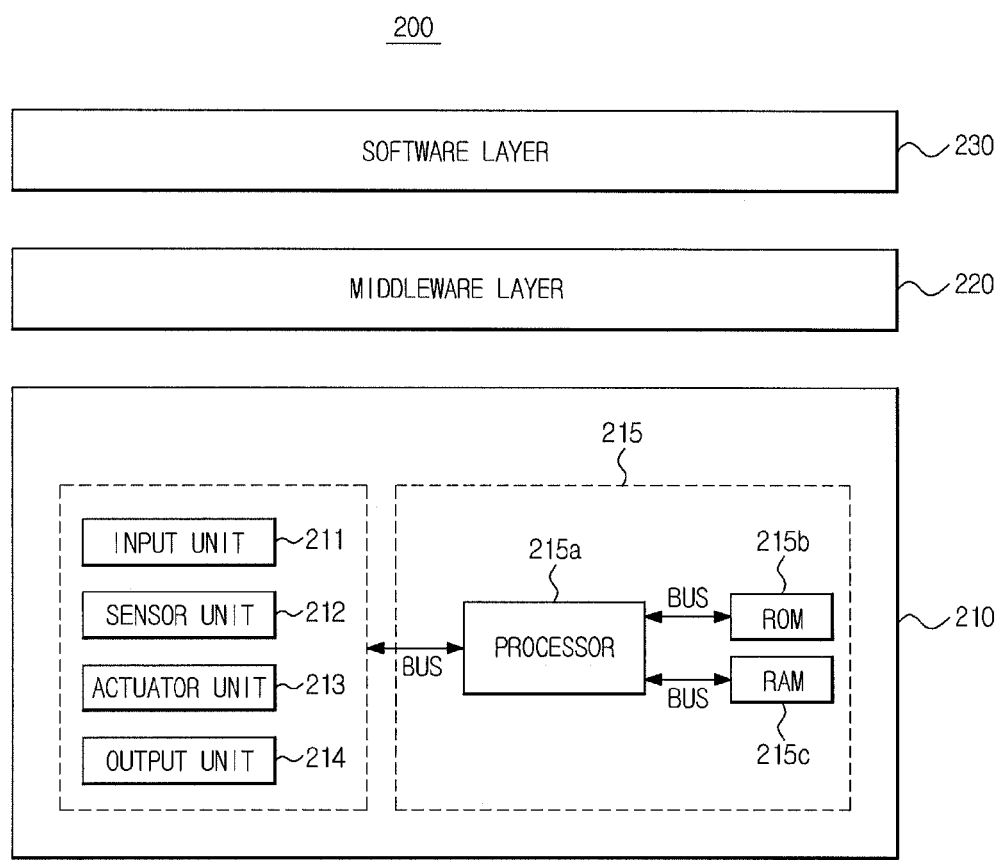
FIG. 2 is a control block diagram of a robot control system to control the robot in accordance with one embodiment.
Figure 3:
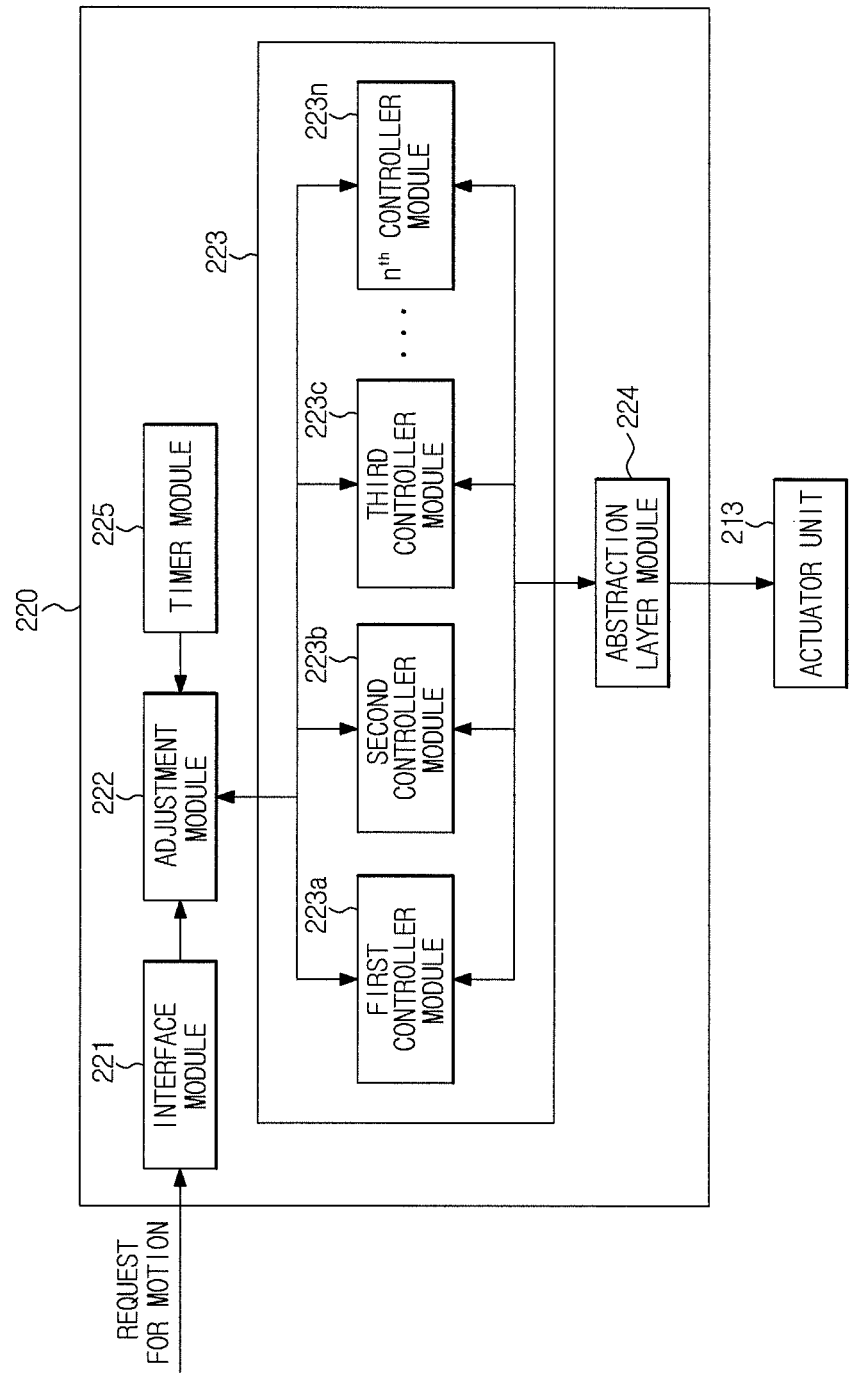
FIG. 3 is a detailed control block diagram of a middleware layer of the robot control system in accordance with one embodiment.

FIG. 2 is a control block diagram of a robot control system to control the robot in accordance with one embodiment and FIG. 3 is a detailed control block diagram of a middleware layer of the robot control system in accordance with one embodiment.

As shown in FIG. 2, a robot control system 200 may include a hardware layer 210, a middleware layer 220 and a software layer 230.

The hardware layer 210 may include hardware provided in the robot 100.

The hardware layer 210 may include an input unit 211, a sensor unit 212, an actuator unit 213, an output unit 214 and a control unit 215.

The input unit 211 may include an user interface (UI; not shown) to receive a motion control command of the robot from a user, the cameras 111 to capture surrounding images and the microphones 112 to detect a user's voice and sound around the robot 100.

The sensor unit 212 may include the pose detection unit 133 to detect a pose of the upper body, the multi-axis F/T sensors 171 to detect whether or not the robot lands and a support leg and a swing leg corresponding to whether or not the robot lands, and encoders (not shown) to detects rotation frequencies of motors.

The actuator unit 213 may include a plurality of actuators, and joints of the robot may be mechanically connected to the respective plural actuators.

These plural actuators may include motors to drive the respective joints, and the motors may be driven according to instructions from the control unit 215, thus perform a motion corresponding to a user command.

The actuator unit 213 may include an electrical interface representing a result of execution of the control command of the control unit 215.

Further, the actuator unit 213 may further include respective detection units of the input unit 211 and the sensor unit 212 because control of the cameras 111 of the input unit 211 or the respective detection units of the sensor unit 212 may be necessary.

The output unit 214 may include a speaker to output sound, a display lamp to output light, etc.

The control unit 215 may perform data calculation processing based on data transmitted from the input unit 211 and the sensor unit 212, thereby controlling drive of the actuator unit 213 and the output unit 214. The control unit 215 may include a processor 215a, a read only memory (ROM) 215b and a random access memory (RAM) 215c.

The processor 215a may be a central processing unit (CPU). The processor 215a may execute a hardware-independent program, such as an application, under the control of a software or a hardware-dependent program, such as middleware, thereby generally controlling overall operation of the robot 100.

The processor 215a may be connected to memories, such as the ROM 215b and the RAM 215c, though buses.

Unique addresses (Memory addresses or I/O addresses) may be respectively allocated to the respective components 215a, 215b and 215c on the buses, and the processor 215a may be communicable with at least one of the ROM 215b and the RAM 215c through addresses assignment. Here, the buses may be common signal transmission lines including an address bus, a data bus and a control bus.

The ROM 215b may be a nonvolatile memory which stores a program, such as an application to control motions or thought of the robot or a middleware to drive hardware.

The RAM 215c may be a volatile memory which load a program executed by the processor 215a or temporarily saves data thereof.

The RAM 215c may perform mapping of an application transmitted from the ROM 215b or a program of the middleware layer 220 on a memory space.

The middleware layer 220 may include program modules to perform motions of the robot 100. The middleware layer 220 may include an interface module 221, an adjustment module 222, controller modules 223, an abstraction layer module 224 and a timer module 225.

The interface module 221 receives a request to perform at least one motion from an external motion task client (not shown), and performs feedback of a process of performing the motion.

Here, the motion means a movement which the robot will perform according to a request of an external program module, and may be expressed by various parameters.

Further, the motion task client (not shown) may be an external program module or the UI of the input unit 211 which may make a request for at least one motion to the interface module 221 of the middleware layer 220.

The adjustment module 222 may control execution of the controller modules 223 so that the motion requested by the motion task client (not shown) may be performed.

The adjustment module 222, when a signal to execute at least one motion is transmitted from the motion task client (not shown) to the adjustment module 222, may select one of the controller modules 223 to execute the transmitted motion and may transmit a tick signal to the selected controller module 223.

Here, the tick signal may be generated corresponding to a tick signal transmitted from the timer module 225.

The adjustment module 222, if there is no controller module 223 to execute the corresponding motion during selection of the controller module 223 to execute the motion, may generate the controller module which may execute the corresponding motion.

Here, the generation of the controller module which may execute the corresponding motion may be carried out by selecting a controller module, actuator control rights of which are not permitted, out of the plural controller modules through search of the controller modules and then allowing the selected controller module to execute the corresponding motion.

The adjustment module 222 may detect the controller module 223 which may execute the corresponding motion, generate a program of the detected controller module 223, ask the controller module 223 a question as to which actuators are necessary to execute the corresponding motion, judge whether or not the corresponding actuators are available when data of the actuator corresponding to a result of the question is transmitted from the controller module 223 to the adjustment module 222, cancel permission of the control rights of the controller module 223 to control the corresponding actuators if the corresponding actuators are unavailable, and provide control rights over control the corresponding actuators to the controller module 223 if the corresponding actuators are available.

Here, the adjustment module 222 may transmit a request signal, to permit the controller module 223 to have the control rights over the corresponding actuators, to the abstraction layer module 224 so that the controller module 223 has the control rights over control the corresponding actuators. Further, the adjustment module 222 also may transmit an identification (for example, an ID of a run unit) to identify the controller module 223 to the abstraction layer module 224.

The adjustment module 222, when a control right permission request signal of the corresponding controller module 223 is transmitted from the abstraction layer module 224 to the adjustment module 222, may register data of the corresponding controller module 223 and the corresponding actuators in a controller module list.

The adjustment module 222 may manage the executing controller module list, monitor executing states, such as execution and interruption, of the respective controller modules 223, and, when the adjustment module 222 receives a control right violation signal from the abstraction layer module 224, delete the controller module 223, actuator control rights of which are violated, from the controller module list.

Here, the controller module list may store ID data of the run units of the controller modules 223 having the control rights over the respective actuators.

The run unit may be independently executed on an operating system (OS), and may be, for example, a thread, a task or a process according to the OS used.

The adjustment module 222, when a motion execution request signal is transmitted to the adjustment module 222, may instruct the controller module 223 to be executed corresponding to the periodic tick signal of the timer module 225.

The adjustment module 222 may execute interfaces (for example, registerControlRight, releaseControlRight, registerRegRight, releaseRegRight, etc.) provided by the abstraction layer module 224 in the independent run unit of the same OS.

The adjustment module 222 may have control registration rights over all of the actuators.

The adjustment module 222 may make a request for control registration rights over all of the actuators to the abstraction layer module 224, and, when a control registration rights permission signal is transmitted from the abstraction layer module 224 to the adjustment module 222, acquire the control registration rights over all of the actuators.

The adjustment module 222 may make a request for the control registration rights to the abstraction layer module 224 during initialization. Here, the control registration rights may mean, for example, rights providing the control rights to the controller modules 223, to register the control rights of the controller modules 223 or to withdraw the control rights of the controller modules 223.

The controller modules 223: 223*a*, 223*b*, 223*c*, . . . , and 223*n* may store programs, each of which interprets at least one motion and converts the at least motion into a control command to abstracted actuators.

A plurality of controller modules 223: 223*a*, 223*b*, 223*c*, . . . , and 223*n* may be provided, and each of the respective controller modules 223: 223*a*, 223*b*, 223*c*, . . . , and 223*n* may store a program corresponding to any one motion. These controller modules 223: 223*a*, 223*b*, 223*c*, . . . , and 223*n* may respectively have independent run units on the OS, and the run unit of each of the controller modules 223: 223*a*, 223*b*, 223*c*, . . . , and 223*n* may store an ID.

Here, the run unit may be, for example, one of a thread, a task and a process divided according to the OS used.

The plural controller modules 223: 223*a*, 223*b*, 223*c*, . . . , and 223*n*, when control rights over the actuators are provided from the adjustment module 222 to the controller modules 223: 223*a*, 223*b*, 223*c* . . . , and 223*n*, may respectively store the control rights.

Here, the control right may be a right allowing the controller module to control the actuator, and may include, for example, a right to control movement of the robot to a desired position, a right to control movement of the robot at a desired speed, a right to control starting of sensor calibration or a right to control movement of the robot with desired torque or force.

The controller module 223, when the tick signal is transmitted from the adjustment module 222 to the controller module 223, may execute a program and transmit a control command corresponding to a result of the program execution using an application programming interface (API) to the abstraction layer module 224.

Here, the API may be an interface provided by the abstraction layer module 224.

The controller module 223, when a question signal as to which actuators are necessary is transmitted from the adjustment module 222 to the controller module 223, may decide which actuators are necessary and transmit the necessary actuators to the adjustment module 222.

That is, during deciding which actuators are necessary, the controller module 223 may decide which actuators are necessary to execute the corresponding motion based on the motion data transmitted from the interface module 221 or the adjustment module 222 and transmit data of the necessary actuators decided corresponding to the question from the adjustment module 222.

Further, the controller module 223 may make a request for the control right of the necessary actuators directly to the adjustment module 222.

These controller modules 223: 223*a*, 223*b*, 223*c*, . . . , and 223*n* may be implemented so as to be suitable for an interface set for communication with the adjustment module 222.

The interface satisfied by the controller modules 223: 223*a*, 223*b*, 223*c*, . . . , and 223*n* may, for example, be getRequireResources to ask a question as to which actuators are necessary to execute the motion, an on Tick algorithm executed when a timer tick is generated, and a getId function to return the IDs of the run units of the controller modules 223: 223*a*, 223*b*, 223*c*, . . . , and 223*n*.

Here, the on Tick algorithm may be executed in the independent run unit on the OS.

The abstraction layer module 224 may be a robot hardware abstraction layer module which abstracts the plural actuators of the actuator unit 213 so as to be used through a consistent interface. That is, the abstraction layer module 224 may allow the actuators, which perform the same function but have different specifications, to be consistently accessible.

The abstraction layer module 224, when a control command is transmitted from the controller module 223 to the abstraction layer module 224, may confirm whether or not the controller module 223 having transmitted the control command is an owner of the control right over the actuator to be controlled.

Here, the confirmation as to whether or not the controller module 223 is the owner of the control right over the actuator may be achieved by checking whether or not the ID of the run unit of the controller module 223 having transmitted the control command is identical with the ID of the run unit of the controller module having the control right over the actuator stored in the adjustment module 222.

The OS may provide a system call to detect the ID of the run unit executing the current code, and thereby the abstraction layer module 224 may confirm the ID of the run unit of the controller module 223.

The abstraction layer module 224 may convert the control command into a low-level control command readable by the actuator and may transmit the low-level control command to the actuator, upon confirming that the controller module 223 having transmitted the control command is the owner of the control right over the actuator to be controlled.

The abstraction layer module 224 may transmit a control right violation signal of the corresponding controller module 223 to the adjustment module 222, upon confirming that the controller module 223 having transmitted the control command is not the owner of the control right over the actuator to be controlled.

The abstraction layer module 224 may provide interfaces to permit the control rights of the controller modules 223 to the respective actuators or to withdraw the control rights of the respective controller modules 223.

The interfaces provided by the abstraction layer module 224 may include, for example, registerControlRight permitting only the adjustment module 222 having the control registration rights to provide and register the control rights, releaseControlRight permitting only the adjustment module 222 having the control registration rights to withdraw the control rights, registerRegRight permitting the adjustment module 222 executing the initial application programming interface to have the control registration rights, and releaseRegRight withdrawing the control registration rights of the adjustment module 222.

Further, the abstraction layer module 224 may include the API.

The abstraction layer module 224, when a control registration right request signal to register the control rights over all of the actuators is transmitted from the adjustment module 222 to the abstraction layer module 224, may confirm whether or not there is any module already having the control registration rights, may reject the control registration right request if there is any module already having the control registration rights, and may permit the adjustment module 222 having made the request for the control registration rights to have the control registration rights if there is no module already having the control registration rights.

Here, the confirmation as to whether or not there is any module already having the control registration rights may be achieved by confirming whether or not the ID of the module permitted to have the control registration modules is stored in the abstraction layer module 224.

The timer module 225 may generate a tick signal per designated period, and transmits the tick signal to the adjustment module 222. That is, the adjustment module 222 may transmit the tick signal to the controller modules 223, thereby operating the plural controller modules 223 based on the tick signal.

Alternatively, the timer module 225 may transmit the tick signal directly to the plural controller modules 223.

The software layer 230 may be provided with a plurality of programs used to operate the robot.

That is, such a software layer 230 may be provided with an emotional model in which emotion of the robot is modeled, an instinct model in which instinct of the robot is modeled, a learning model in which cause-and-effect relationships between an external mapping and motions performed by the robot are sequentially memorized, and a motion model in which motion patterns are modeled. These models may include programs.

The software layer 230 may perform communication with the middleware layer 220 through a programming interface.

Figure 4:
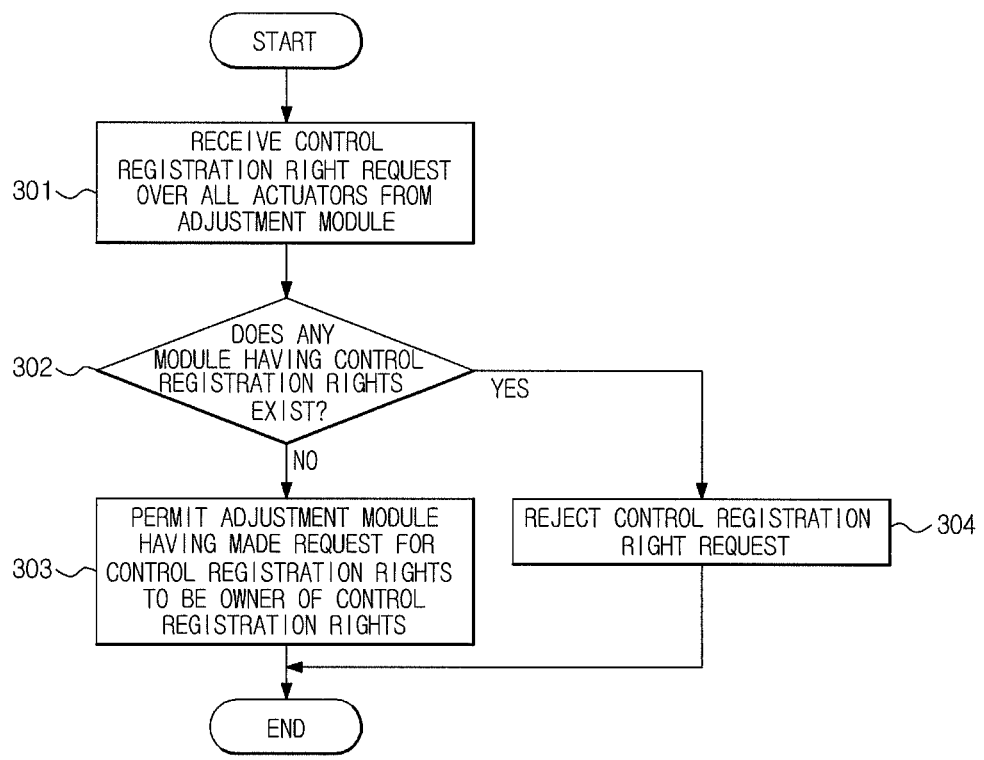
FIG. 4 is a flow chart illustrating a process of acquiring control registration rights of the robot control system in accordance with one embodiment.

FIG. 4 is a flow chart illustrating a process of acquiring control registration rights of the adjustment module from the abstraction layer module of the robot control system in accordance with one embodiment.

If the plural controller modules 223: 223*a*, 223*b*, 223*c*, ..., and 223*n* arbitrarily register control rights through the abstraction layer module 224, the control rights of the respective controller modules 223: 223*a*, 223*b*, 223*c*, ..., and 223*n* may not be adjusted.

Therefore, the plural controller modules 223: 223*a*, 223*b*, 223*c*, ..., and 223*n* may receive the control rights only through the adjustment module 222, thereby preventing collisions between programs of the plural controller modules 223: 223*a*, 223*b*, 223*c*, ..., and 223*n*. This will be described in more detail, as follows.

First, the adjustment module 222 may make a request for control registration rights to the abstraction layer module 224 in order to acquire the control registration rights to provide and register the control rights over all of the actuators of the robot.

At this time, when the abstraction layer module 224 receives a control registration right request signal from the adjustment module 222 (Operation 301), the abstraction layer module 224 may confirm whether or not there is any module already having the control registration rights (Operation 302).

Thereafter, if there is no module already having the control registration rights, the abstraction layer module 224 may permit the adjustment module 222 having made the request for the control registration rights to be an owner of the control registration rights (Operation 303). Here, the ID of the adjustment module 224 may be permitted to be the owner of the control registration rights.

Here, the ID may mean an ID of a run unit, and the run unit may be independently executed on an operation system (OS) and may be, for example, one of a thread, a task and a process divided according the OS used.

On the other hand, if there is any module already having the control registration rights, the abstraction layer module 224 may reject the control registration right request of the adjustment module 222 (Operation 304).

Figure 5:
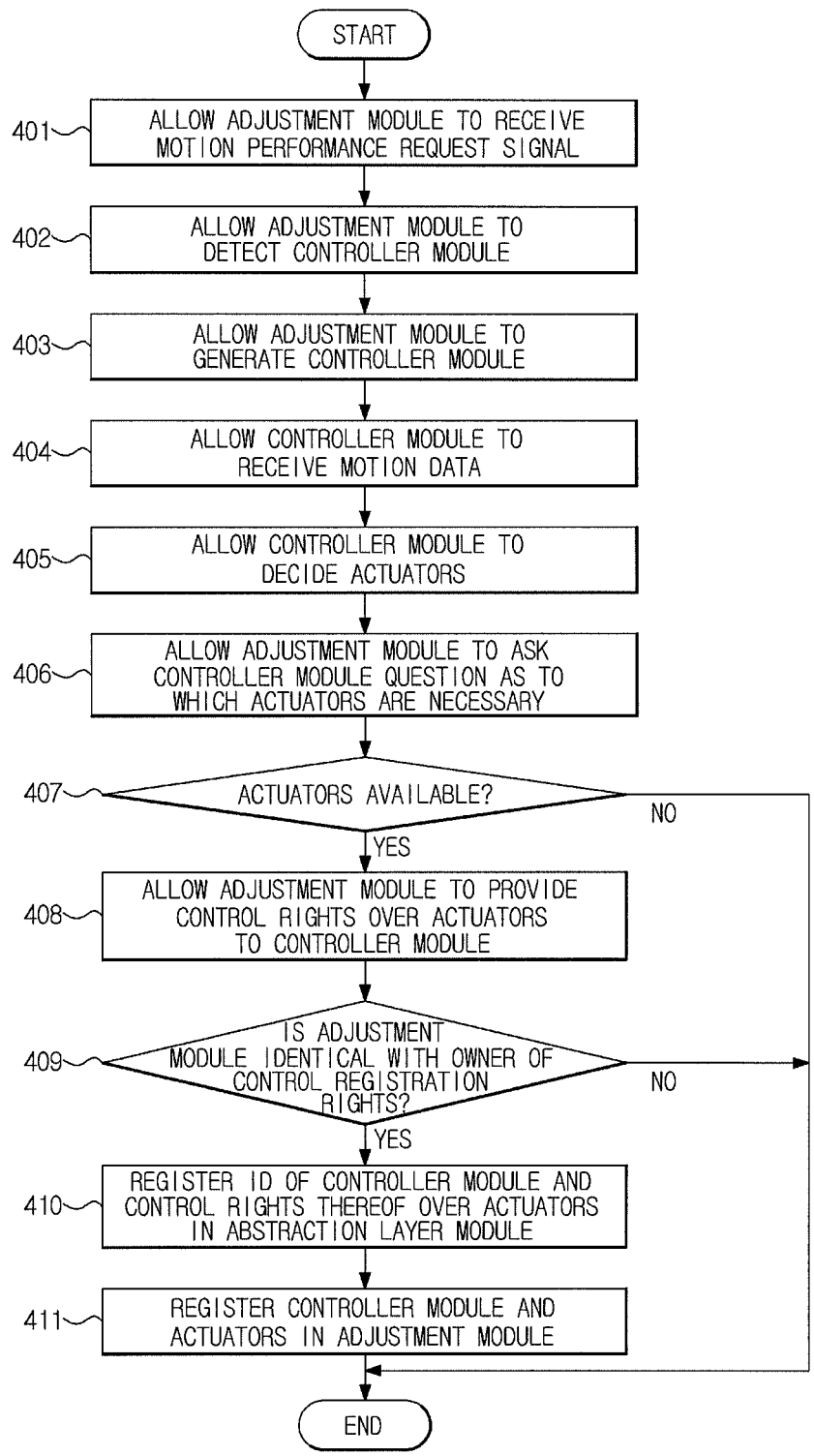
FIG. 5 is a flow chart illustrating a process of registering control rights of controller modules of the robot control system in accordance with one embodiment.

FIG. 5 is a flow chart illustrating a process of registering control rights of the controller modules of the robot control system in accordance with one embodiment.

For example, it may be assumed that the adjustment module 222 may have control registration rights over the actuators a1, a2, a3, a4, a5, a6, a7 and a8 and may store a controller module list in which controls rights of the respective controller modules over the actuators a1, a2, a3, a4, a5, a6, a7 and a8 are registered.

Further, it may be assumed that, according to the controller module list, the first controller module 223*a* to perform a first motion m1 may have control rights over the actuators a1 and a2 and the second controller module 223*b* to perform a second motion m2 may have control rights over the actuators a3, a4 and a5.

First, when the interface module 221 requests performance of plural motions m1, m2 and m3, the interface module 221 may transmit a performance request signal of the plural motions m1, m2 and m3 to the adjustment module 222.

When the adjustment module 222 receives the performance request signal of the plural motions m1, m2 and m3 (Operation 401), the adjustment module 222 may detect the controller modules which may respectively perform the plural motions m1, m2 and m3 through search of the plural controller modules 223: 223*a*, 223*b*, 223*c*, ..., and 223*n* (Operation 402).

Here, the first controller module 223*a* to perform the first motion m1 and the second controller motion 223*b* to perform the second motion m2 may be detected, but the controller module to perform the third motion m3 may not be detected from the adjustment module 222.

That is, if there is no controller module to perform the third motion m3 which is any one of the plural motions m1, m2 and m3, the controller module to perform the third motion m3 may be generated (Operation 403).

At this time, the adjustment module 222 may detect executable controller modules through search of the controller modules 223*c*, ..., and 223*n*, actuator control rights of which are not permitted, out of the plural controller modules 223: 223*a*, 223*b*, 223*c*, ..., and 223*n*, may select the controller module which may perform the third motion m3 out of the detected executable controller modules, and may generate a program to perform the third motion m3 in the selected controller module, thereby generating the controller module to perform the third motion m3. Here, it may be assumed that the generated controller module may be the third controller module 223*c*.

If the controller module which may perform the third motion is generated in advance, generation of the controller module may be omitted.

Thereafter, the controller module 223c may receive detailed motion data from the interface module 221 (Operation 404). At this time, the controller module 223 may receive the motion data from the adjustment module 22.

Thereafter, the controller module 223 may decide which actuators are necessary to perform the third motion m3 by analyzing various parameters in the motion data (Operation 405).

Thereafter, the adjustment module 222 may ask the third controller module 223c a question as to which actuators are necessary to execute the third motion m3 (Operation 406).

Here, the third controller module 223c may transmit data of the actuators decided based on the request signal of the adjustment module 222 to the adjustment module 222.

When the data of the decided actuators are transmitted from the third controller module 223c to the adjustment module 222, the adjustment module 222 may judge whether or not the corresponding actuators are available (Operation 407), may cancel permission of the control rights of the third controller module 223c to control the corresponding actuators if the corresponding actuators are unavailable, and may provide the control rights to control the corresponding actuators to the third controller modules 223 if the corresponding actuators are available (Operation 408).

For example, on the assumption that the actuators decided by the controller module 223c are actuators a1, a7 and a8, the actuator a1 is the actuator to perform the first motion m1 and thus the actuator a1 is operated to perform both the first motion m1 and the third motion m3.

That is, if the first motion m1 and the third motion m3 are operated by controlling the actuator a1, a collision between the first controller module 223a to perform the first motion m1 and the third controller motion 223c to perform the third motion m3 may be generated.

Thereby, the adjustment module 222 judges the actuator a1 to be an unavailable actuator and may cancel permission of the control right of the third controller module 223c over the actuator a1.

On the other hand, if the actuators decided by the controller module 223c are actuators a6, a7 and a8, the actuators a6, a7 and a8 are operated to perform only the third motion m3 and thus are available.

Thereby, the adjustment module 222 may judge the actuators a6, a7 and a8 to be available actuators and thus provides the control rights to control the actuators a6, a7 and a8 to the third controller module 223c.

Further, instead of the adjustment module 222 asking the controller module 223 the question as to which actuators are necessary to execute the third motion m3, the controller module 223 may make a request for control rights over the necessary actuators to the adjustment module 222.

In this case, so as to allow the controller module 223 to make the request for control rights over the necessary actuators to the adjustment module 222, the adjustment module 222 may provide an interface, such as askCtrlRight. As factors of askCtrlRight, at least the IDs of the run units of the controller modules 223 and a list of the necessary actuators may be provided, thereby allowing the adjustment module 222 to know as to which controller module 223 make a request for control rights over which actuators.

Thereafter, the adjustment module 222 may transmit a request signal permitting the third controller module 223c to have the control rights over the actuators a6, a7 and a8 to the abstraction layer module 224 so that the third controller module 223c may have the control rights over the actuators a6, a7 and a8.

Further, the adjustment module 222 also may transmit the ID (for example, the ID of the run unit) of the third controller module 223c to the abstraction layer module 224.

Thereafter, when the request signal permitting the third controller module 223c to have the control rights over the actuators a6, a7 and a8 is transmitted from the adjustment module 222 to the abstraction layer module 224, the abstraction layer module 224 may confirm whether or not the adjustment module 222 having made the request for permission of the third controller module 223c to have the control rights over the actuators a6, a7 and a8 is an owner of the control registration rights (Operation 409).

At this time, the abstraction layer module 224 may check whether or not the ID of the adjustment module 222 having made the request for permission of the third controller module 223c to have the control rights over the actuators a6, a7 and a8 is identical with an ID of a control registration right owner stored in the abstraction layer module 224, thereby confirming whether or not the adjustment module 222 having made the request for permission of the third controller module 223c to have the control rights over the actuators a6, a7 and a8 is the control registration right owner.

Therefore, if the ID of the adjustment module 222 having made the request for permission of the third controller module 223c to have the control rights over the actuators a6, a7 and a8 is identical with the ID of the control registration right owner stored in the abstraction layer module 224, the abstraction layer module 224 may register the ID of the third controller module 223c and the control rights of the third controller module 223c over the actuators a6, a7 and a8 (Operation 410).

Thereafter, the adjustment module 222 may register the ID of the third controller module 223c and the control rights of the third controller module 223c over the actuators a6, a7 and a8 in the controller module list (Operation 411).

As described above, in order to request control rights over necessary actuators, the plural controller modules 223: 223a, 223b, 223c, . . . , and 223n may require mediation of the adjustment module 222. Thereby, the adjustment module 222 may control overall operation of the system. Such a process may be carried out at a motion control initialization stage of the robot or in the middle of performance of a motion.

Figure 6:
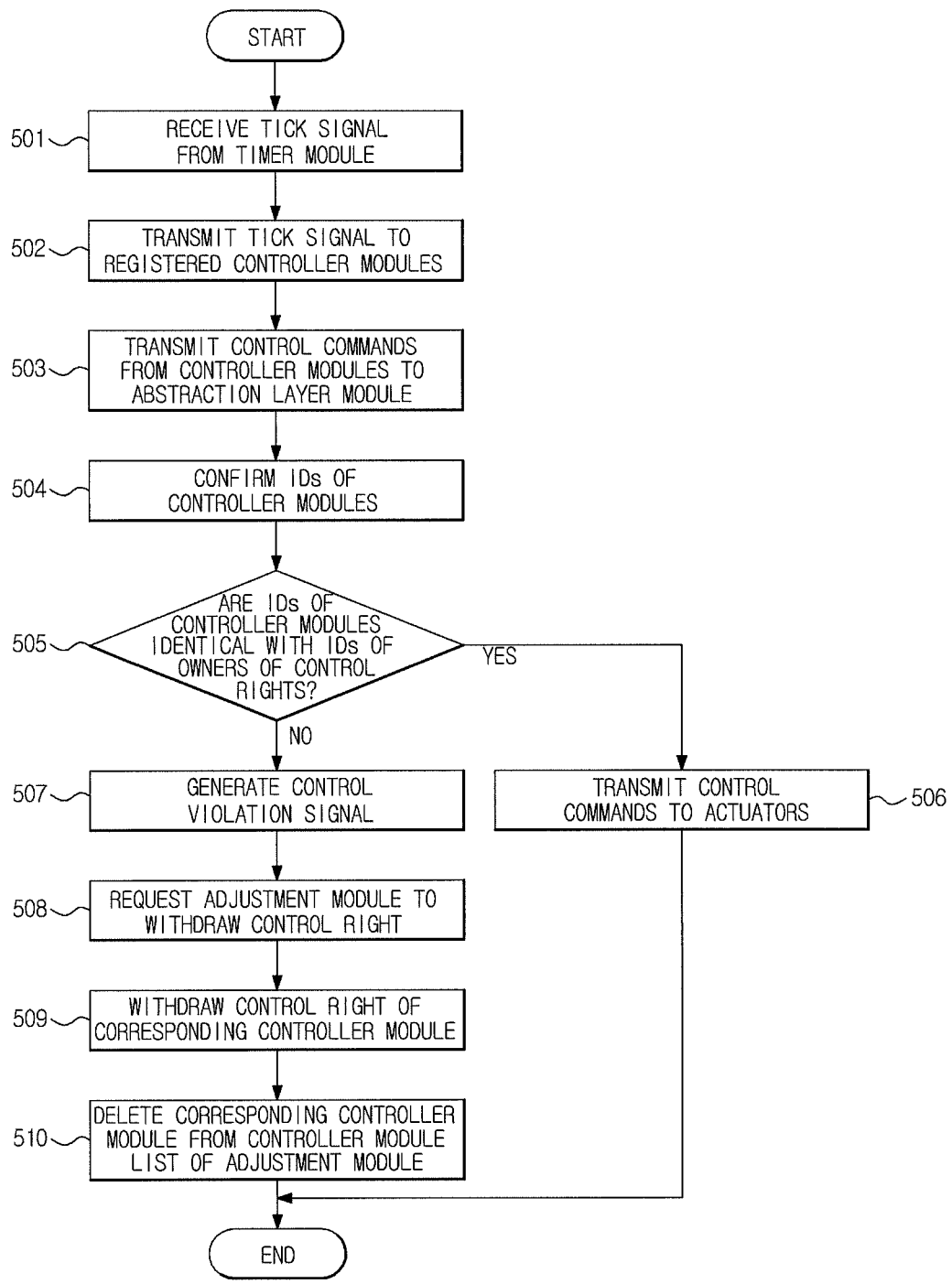
FIG. 6 is a flow chart illustrating a robot control method using the robot control system in accordance with one embodiment.

FIG. 6 is a flow chart illustrating a robot control method using the robot control system in accordance with one embodiment.

It is assumed that the adjustment module 222 has control registration rights over the actuators a1, a2, a3, a4, a5, a6, a7 and a8 and stores a controller module list in which controls rights of the respective controller modules over the actuators a1, a2, a3, a4, a5, a6, a7 and a8 are registered.

Here, it is assumed that, according to the controller module list, the first controller module 223a to perform a first motion m1 has control rights over the actuators a1 and a2, the second controller module 223b to perform a second motion m2 has control rights over the actuators a3, a4 and a5, the third controller module 223c to perform a third motion m3 has control rights over the actuators a6 and a7, and an $n^{th}$ controller module 223n to perform the $n^{th}$ motion mn has a control right over the actuator a8.

First, when the adjustment module 222 receives a tick signal from the timer module 225 (Operation 501), the adjustment module 222 may transmit the tick signal to the first, second and third controller modules 223a, 223b and 223c to perform the first, second and third motions m1, m2 and m3 (Operation 502).

Here, as one example of the transmission of the tick signal to the controller modules 223a, 223b and 223c, the tick signal may be transmitted to the controller modules by calling call back functions registered in the controller modules 223a, 223b and 223c.

Thereafter, the first, second and third controller modules 223a, 223b and 223c respectively may execute programs to process the first, second and third motions m1, m2 and m3, and respectively transmits results of the execution to the abstraction layer module 224 through control commands (Operation 503).

Here, the controller modules 223a, 223b and 223c having received the tick signal may execute programs on thread contexts thereof.

As one example of the execution of the programs on the thread context of the controller modules 223a, 223b and 223c, the controller modules 223, 223b and 223c may respectively create message queues and the adjustment module 222 may transmit the tick signal through the message queues. That is, inter-thread communication may be used.

If the controller modules 223a, 223b and 223c are operated as independent processes, the tick signal may be transmitted, for example, using inter-process communication or inter-task communication supported by various OSs or TCP/IP communication, and the controller modules 223a, 223b and 223c may execute the programs on contexts thereof.

Thereafter, the abstraction layer module 224 may receive the control commands from the first, second and third modules 223a, 223b and 223c, and then respectively may confirm IDs of the first, second and third modules 223a, 223b and 223c having transmitted the control commands (Operation 504).

Thereafter, the abstraction layer module 224 may confirm whether or not the respective controller modules 223a, 223b and 223c are owners of control rights over the respective actuators (Operation 505).

That is, the confirmation as to whether or not the controller modules 223a, 223b and 223c are the owners of the control rights over the respective actuators may be achieved by checking whether or not IDs of run units of the controller modules 223a, 223b and 223c having transmitted the control commands are identical with IDs of the run units of the respective controller modules 223a, 223b and 223c having the control rights over the plural actuators a1 to a7 stored in the adjustment module 222.

If the IDs of the first, second and third controller modules 223a, 223b and 223c may be identical with the IDs of the owners of the control rights over the respective actuators, the abstraction layer module 224 may convert the control commands transmitted by the first, second and third controller modules 223a, 223b and 223c into low-level control commands readable by the actuators a1 to a7 and transmits the low-level control commands to the actuators a1 to a7 (Operation 506).

On the other hand, if the IDs of the first, second and third controller modules 223a, 223b and 223c are not identical with the IDs of the owners of the control rights over the respective actuators, this state may be judged to be a control right violation state and thus a control right violation signal may be generated (Operation 507).

For example, when the $n^{th}$ controller module 223n transmits a control command and transmits a signal to control the actuators a7 and a8 to the abstraction layer module 224, the abstraction layer module 224 may confirm an ID of the controller module having the control rights over the actuators a7 and a8.

At this time, it may be understood that the controller module having the control right over the actuator a7 stored in the abstraction layer module 224 is the third controller module 223c, the controller module having the control right over the actuator a8 stored in the abstraction layer module 224 is the $n^{th}$ controller module 223n, and thus the third controller module 223c having the control right over the actuator a7 and the $n^{th}$ controller module 223n having transmitted the control command are different. That is, it may be understood that the ID of the third controller module 223c and the ID of the $n^{th}$ controller module 223n are different.

Here, the actuator a7 may be an actuator over which the adjustment module 222 does not permit the $n^{th}$ controller module 223n to have the control right, and thus it may be proved that the transmission of the control right over the actuator a7 from the $n^{th}$ controller module 223n is false.

Therefore, the abstraction layer module 224 may generate the control right violation signal indicating that the $n^{th}$ controller module 223n violates the control right, and may request the adjustment module 222 to withdraw the control right of the $n^{th}$ controller module 223n (Operation 508) over the actuator a7. Here, as one example of the control right violation signal, a signal called controlViolated may be generated.

At this time, the control right violation signal may include the ID of the $n^{th}$ controller module 223n violating the control right.

For example, the control right violation signal may include data regarding the actuator to be controlled. As one example of the generation of the control right violation signal, the call back function may be called.

Thereafter, the adjustment module 222 may receive the controlViolated signal, and may withdraw the control right of the $n^{th}$ controller module 223n from the controller module list using the ID of the $n^{th}$ controller module 223n as a key (Operation 509).

Further, the adjustment module 222 may request the abstraction layer module 224 to withdraw the control right of the $n^{th}$ controller module 223.

Thereafter, the adjustment module 222 may delete the $n^{th}$ controller module 223n violating the control right from the controller module list (Operation 510). Thereby, the $n^{th}$ controller module 223n may not be executed from the next period and influence of the $n^{th}$ controller module 223n on other controller modules may be prevented.

As described above, the respective controller modules 223 may not receive the tick signal directly from the timer module 225 but the adjustment module 222 may transmit the tick signal only to the registered controller modules, thereby preventing the controller modules, which are not permitted to have control rights over the actuators, from executing programs.

As is apparent from the above description, a robot control system and method in accordance with one embodiment prevents control collisions between plural controller modules under the condition that the plural controller modules coexist, thereby securing stability of a robot.

Further, the robot control system and method, which prevents control collisions between the plural controller modules, secures stability of the robot while simultaneously performing several motions, and prevents failure of the robot, environmental destruction and harm to humans.

Moreover, the robot control system and method allows an adjustment module to prevent control collisions between the plural controller modules, thereby allowing a program developer to focus on program development without concern for control collisions.

Although a few embodiments of the present invention have been shown and described, it would be appreciated by those skilled in the art that changes may be made in these embodi-

What is claimed is:

1. A robot control system comprising:
   a plurality of actuators provided on a robot;
   a plurality of controller modules, each of which controls at least one of the plurality of actuators and includes an identifier (ID) and a program to perform a motion of the robot;
   an adjustment module to register a control right of each of the plurality of controller modules over at least one of the plurality of actuators and to detect a controller module from the plurality of controller modules capable of performing at least one motion when a request for the at least one motion is made; and
   an abstraction layer module to judge whether or not the detected controller module is a controller module having the control right over the at least one of the plurality of actuators by confirming the ID of the detected controller module, and to drive the at least one of the plurality of actuators by controlling execution of the controller module upon judging that the detected controller module is the controller module having the control right over the at least one of the plurality of actuators, wherein
   the adjustment module asks the controller modules a question as to which actuators are necessary to execute the at least one motion.

2. The robot control system according to claim 1, further comprising an interface module requesting the at least one motion of the robot.

3. The robot control system according to claim 1, wherein the plurality of controller modules, when receiving a question as to which actuators are necessary to execute the at least one motion, determines a plurality of actuators capable of performing the at least one motion, and transmits data of the determined plurality of actuators to the adjustment module.

4. The robot control system according to claim 3, wherein the adjustment module, after receiving the data of the determined plurality of actuators, judges whether or not the determined plurality of actuators are available, provides the control rights over the determined plurality of actuators to the plurality of controller modules if the actuators are available, and cancels execution of the plurality of controller modules if the actuators are unavailable.

5. The robot control system according to claim 1, wherein the plurality of controller modules determines a plurality of actuators capable of performing the at least one motion, and makes a request for the control rights over the determined plurality of actuators to the adjustment module.

6. The robot control system according to claim 1, wherein the adjustment module requests control registration rights over each of the plurality of actuators from the abstraction layer module, and registers the control registration rights over each of the plurality of actuators when a control registration right permission signal is transmitted from the abstraction layer module to the adjustment module.

7. The robot control system according to claim 6, wherein the abstraction layer module, when the abstraction layer module receives a control registration right request signal over each of the plurality of actuators from the adjustment module, confirms whether or not there is any controller module already having the control registration rights over each of the plurality of actuators, and permits the adjustment module to have the control registration rights over each of the plurality of actuators if there is no controller module already having the control registration rights.

8. The robot control system according to claim 1, further comprising a timer module to generate a tick signal per designated period,
   wherein the adjustment module instructs the detected controller module to execute the program corresponding to the tick signal from the timer module.

9. The robot control system according to claim 8, wherein the abstraction layer module, when a control command corresponding to execution of a program of the detected controller module is transmitted to the abstraction layer module, confirms whether or not the detected controller module is an owner of the control right over the at least one of the plurality of actuators, and transmits the control command to the at least one of the plurality of actuators upon confirming that the detected controller module is the owner of the control right over the at least one of the plurality of actuators.

10. The robot control system according to claim 9, wherein the abstraction layer module transmits a control violation signal to the adjustment module upon confirming that the detected controller module is not the owner of the control right over the at least one of the plurality of actuators.

11. The robot control system according to claim 10, wherein the abstraction layer module includes an interface to register and withdraw the control registration rights.

12. The robot control system according to claim 10, wherein the adjustment module manages a controller module list having data regarding the control rights of the controller modules over the actuators, and, when the adjustment module receives the control right violation signal from the abstraction layer module, deletes the controller module, the control right of which is violated, from the controller module list.

13. The robot control system according to claim 9, wherein:
    the abstraction layer module includes an application programming interface (API); and
    the detected controller module transmits the control command to the abstraction layer module using the API.

14. The robot control system according to claim 1, wherein:
    each of the plurality of controller modules and the adjustment module includes a run unit; and
    the run unit is one of a thread, a task and a process.

15. A robot control method in which at least one motion is performed by controlling at least one of a plurality of actuators provided on a robot, the robot control method comprising:
    receiving, by an adjustment module, a request for performance of the at least one motion;
    detecting a controller module from a plurality of controller modules capable of performing the at least one motion;
    transmitting a control command corresponding to the performance of the at least one motion to an abstraction layer module;
    judging whether or not the detected controller module is an owner of a control right over the at least one of the plurality of actuators to perform the at least one motion by confirming an identifier (ID) of the detected controller module by the abstraction layer module;
    transmitting the control command from the abstraction layer module to the at least one of the plurality of actuators upon judging that the detected controller module is the owner of the control right over the at least one of the plurality of actuators to perform the at least one motion;
    generating a controller module capable of performing the at least one motion if there is co controller module to perform the at least one motion;

designating the detected controller module or the generated controller module to perform the at least one motion;

deciding, by the designated controller module, the at least one of the plurality of actuators necessary to perform the at least one motion based on motion data to perform the at least one motion;

asking, by the adjustment module, the designated controller module a question as the which actuator is necessary to perform the at least one motion;

transmitting data of the necessary actuator from the designated controller module to the adjustment module;

judging, by the adjustment module, whether or not the necessary actuator is available; and providing, by the adjustment module, a control right over the necessary actuator to the designated controller module upon judging that the necessary actuator is available.

16. The robot control method according to claim 15, further comprising:

transmitting a control right permission request signal, permitting the designated controller module to have the control right over the necessary actuator, from the adjustment module to the abstraction layer module;

judging, by the abstraction layer module, whether or not the adjustment module having transmitted the control right permission request signal is an owner of control registration rights by checking an ID of the adjustment module, when a control right permission request is transmitted to the abstraction layer module;

permitting, by the abstraction layer module, the designated controller module to have the control right over the necessary actuator, upon judging that the adjustment module having transmitted the control right permission request signal is the owner of control registration rights; and driving the necessary actuator by executing a program of the designated controller module.

17. The robot control method according to claim 16, further comprising:

registering the designated controller module as the owner of the control right of the necessary actuator in the abstraction layer module, upon judging that the adjustment module having transmitted the control right permission request signal is the owner of control registration rights; and registering the designated controller module and the necessary actuator in a controller module list stored in the adjustment module.

18. The robot control method according to claim 15, further comprising, after the judgment as to whether or not the necessary actuator is available, canceling the generated controller module upon judging that the necessary actuator is not available.

19. The robot control method according to claim 15, further comprising:

requesting, by the adjustment module, control registration rights, to register the control rights over each of the plurality of actuators provided on the robot, from the abstraction layer module;

confirming, by the abstraction layer module, whether or not there is any controller module already having the control registration rights, when the abstraction layer module receives a control registration right request;

permitting the adjustment module having made the request for the control registration rights to have the control registration rights over each of the plurality of actuators if there is no controller module already having the control registration rights; and acquiring the control registration rights over each of the plurality of actuators, when a control registration right permission signal is transmitted from the abstraction layer module to the adjustment module.

20. The robot control method according to claim 15, further comprising instructing, by the adjustment module, the detected controller module to execute a program, when a tick signal of a timer module is transmitted to the adjustment module.

21. The robot control method according to claim 15, further comprising:

generating, by the abstraction layer module, a control violation signal upon judging that the detected controller module is not the owner of the control right over the at least one of the plurality of actuators;

requesting, by the abstraction layer module, withdrawal of the control right of the designated controller module to the adjustment module; and withdrawing, by the adjustment module, the control right of the detected controller module.

22. The robot control method according to claim 21, wherein the withdrawal of the control right of the detected controller module comprises deleting the controller module, the control right of which is violated, from a controller module list stored in the adjustment module.

23. The robot control method according to claim 15, wherein the judgment as to whether or not the detected controller module is the owner of the control right over the at least one of the plurality of actuators to perform the at least one motion comprises:

confirming an ID of a run unit of the detected controller module; and judging whether or not the ID of the run unit of the detected controller module is identical with an ID of a run unit of a controller module having the control right over the at least one of the plurality of actuators, stored in advance in the abstraction layer module.

24. A robot control system comprising:

a plurality of actuators provided on a robot;

a plurality of controller modules, each of which controls at least one of the plurality of actuators;

an adjustment module to register a control right of each of the plurality of controller modules over at least one of the plurality of actuators when the plurality of controller modules requests the control rights over a determined plurality of actuators from the adjustment module and to detect a controller module from the plurality of controller modules capable of performing at least one motion when a request for the at least one motion is made; and an abstraction layer module to judge whether or not a detected controller module has the control right over the at least one of the plurality of actuators, and to drive the at least one of the plurality of actuators by controlling execution of the controller module, wherein the abstraction layer module confirms whether or not the detected controller module is an owner of the control right over the at least one of the plurality of actuators, and transmits a control command to the at least one of the plurality of actuators, wherein the adjustment module asks the controller modules a question as to which actuators are necessary to execute the at least one motion.

* * * * *